United States Patent
Bendall et al.

(10) Patent No.: US 10,767,376 B2
(45) Date of Patent: Sep. 8, 2020

(54) STRUCTURE FOR STAGING MATERIALS ON A ROOF STRUCTURE

(71) Applicant: FINAL MILE SOLAR LLC, Salt Lake City, UT (US)

(72) Inventors: Nathan Coy Bendall, Salt Lake City, UT (US); Louis J Monaco, Salt Lake City, UT (US)

(73) Assignee: FINAL MILE SOLAR LLC, Salt Lake City, UT (US)

( * ) Notice: Subject to any disclaimer, the term of this patent is extended or adjusted under 35 U.S.C. 154(b) by 108 days.

(21) Appl. No.: 16/216,670

(22) Filed: Dec. 11, 2018

(65) Prior Publication Data
US 2019/0218800 A1 Jul. 18, 2019

Related U.S. Application Data

(60) Provisional application No. 62/618,369, filed on Jan. 17, 2018.

(51) Int. Cl.
*E04G 3/26* (2006.01)
*F24S 25/13* (2018.01)
(Continued)

(52) U.S. Cl.
CPC .............. *E04G 3/265* (2013.01); *E04G 3/22* (2013.01); *E04G 3/243* (2013.01); *E04G 5/003* (2013.01); *F24S 25/13* (2018.05); *F24S 2025/014* (2018.05)

(58) Field of Classification Search
CPC ......... E04G 3/265; E04G 3/243; E04G 5/003; E04G 3/22; E04G 21/3276; F24S 25/13; F24S 2025/014; F24S 2025/01
(Continued)

(56) References Cited

U.S. PATENT DOCUMENTS

| | | | | |
|---|---|---|---|---|
| 673,065 A | * | 4/1901 | Scott | E06C 1/397 |
| | | | | 182/20 |
| 5,193,773 A | * | 3/1993 | Middleton | E04D 15/00 |
| | | | | 248/148 |

(Continued)

FOREIGN PATENT DOCUMENTS

DE         3632735 A1 *  3/1988  ............. E04G 3/265

OTHER PUBLICATIONS

"Johnny Jack for Steel Shingles, Tile and Slate" Retrieved on: Dec. 7, 2018, Retrieved From http://www.acrobuildingsystems.com/product/specialty-roof-brackets/johnny-jack-for-steel-shingles-tile-and-slate.

*Primary Examiner* — Muhammad Ijaz
(74) *Attorney, Agent, or Firm* — Maschoff Brennan

(57) ABSTRACT

The apparatus may include a ridge member, a first arm rotatably coupled to the ridge member and extending outward, relative to the ridge member, in a first plane angled relative to a first pitch of a roof structure. Also, the apparatus may include a second arm rotatably coupled to the ridge member and extending outward, relative to the ridge member, in a second plane angled relative to a second pitch of the roof structure. The ridge member may be positioned at an apex between the first pitch and the second pitch along a ridge of the roof structure. Further, materials for installation may be placed on at least one of the first arm and the second arm positioned between the roof structure and the materials. Additionally, the apparatus may include a load arm coupled at each respective end portion of the first arm and the second arm.

19 Claims, 8 Drawing Sheets

(51) Int. Cl.
*E04G 3/24* (2006.01)
*E04G 5/00* (2006.01)
*E04G 3/22* (2006.01)
*F24S 25/00* (2018.01)

(58) Field of Classification Search
USPC ..................................... 248/148, 237, 155.5
See application file for complete search history.

(56) References Cited

U.S. PATENT DOCUMENTS

| | | | |
|---|---|---|---|
| 5,513,826 A * | 5/1996 | Lebaron | E04D 15/02 248/237 |
| 2007/0125007 A1* | 6/2007 | Alarcon | E04G 3/265 52/25 |
| 2011/0314769 A1* | 12/2011 | Foster, Sr. | E04G 21/3276 52/749.12 |
| 2013/0240699 A1* | 9/2013 | Dillinger | F16M 13/02 248/237 |
| 2015/0101996 A1* | 4/2015 | Nayar | F24S 25/16 211/41.1 |
| 2018/0087808 A1* | 3/2018 | Wehrli | F24S 20/50 |
| 2019/0218800 A1* | 7/2019 | Bendall | E04G 5/003 |

* cited by examiner

STRUCTURE FOR STAGING MATERIALS ON A ROOF STRUCTURE

FIELD

The application relates generally to a structure for staging materials on a roof structure.

BACKGROUND

To perform a solar panel installation on a roof structure, materials may be delivered to the installation site and left on a ground level and perhaps in a manner unprotected from theft or other unwanted tampering/destruction of the materials. Additionally, at an installation appointment, efficiency losses may occur with respect to time and/or expended energy due to transporting delivered materials from the ground level to the roof structure prior to actual installment. Further, in some cases, the delivered materials may not include all the necessary materials for a complete installation; and without adequate preparation and/or organization of the delivered materials prior to the installation appointment, discovery of any missing/damaged materials may not occur until the installation appointment. Such late discoveries may delay installation and lead to unmet expectations and strained rapport with customers.

The subject matter claimed herein is not limited to embodiments that solve any disadvantages or that operate only in environments such as those described above. Rather, this background is only provided to illustrate one example technology area where some embodiments described herein may be practiced.

SUMMARY

Embodiments of the disclosure discuss an apparatus. The apparatus may include a ridge member. Additionally, the apparatus may include a first arm rotatably coupled to the ridge member and extending outward, relative to the ridge member, in a first plane angled relative to a first pitch of a roof structure. Also, the apparatus may include a second arm rotatably coupled to the ridge member and extending outward, relative to the ridge member, in a second plane angled relative to a second pitch of the roof structure. The ridge member may be configured to be positioned at an apex between the first pitch and the second pitch along a ridge of the roof structure. Further, materials for installation may be configured to be placed on at least one of the first arm and the second arm such that one or both of the first arm and the second arm, respectively, are positioned between the roof structure and the materials. Additionally, the apparatus may include a load arm coupled at each respective end portion of the first arm and the second arm, where the load arm may be angled relative to the first arm and the second arm, and the load arm may be configured as a mechanical stop to inhibit pitch translation of the materials placed on at least one of the first arm and the second arm.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Embodiments of the present disclosure may discuss an apparatus for staging materials, such as solar panels, on a roof structure. Solar installations heretofore have involved the inefficient and laborious task of transporting delivered materials from a ground level to the roof structure at the time of installation. Such inefficiencies of time and labor may be due to delivery personnel which typically do not (and in many cases cannot) deliver the solar materials to the roof. For a matter of various reasons such as safety, liability, etc., on-site delivery of materials does not usually extend to the roof structure, irrespective of whether the delivery personnel are employed by general commercial transportation services or specific solar suppliers/distributors. Rather, installers typically do so at the time of installation.

Further, such delivered materials have not heretofore been staged (e.g., prepared for installation) on the roof structure prior to an installation appointment because on-roof placement of de-packaged, sorted, and/or organized solar materials is unsecure (prone to sliding or rolling off the roof structure), unprotected, and/or unviable due to a lack of remaining workspace for maneuvering on the roof structure. Thus, in view of at least the foregoing, an apparatus for staging materials to be installed on a roof structure may be desirable.

Some embodiments described in this disclosure may include a ridge member configured to extend along a ridge of a roof structure, where the ridge of the roof may correspond to a local apex at the joining of two different roof slopes (hereinafter "pitches" or "pitched surfaces"). In some embodiments, a first arm may extend outward from the ridge member and may freely rotate 360 degrees around the ridge member. Thus, when attached to the ridge member, the first arm may be configured to lay on top of one of the pitches, thereby matching the angle of the pitched surface.

In some embodiments, a second arm may also extend outward from the ridge member and may freely rotate 360 degrees around the ridge member. Thus, when attached to the ridge member, the second arm may be configured to lay on top of the other pitch, thereby matching the angle of the other pitched surface.

In some embodiments, a load arm may be attached at an end portion of each of the first arm and the second arm and positioned to jut outwardly away from the roof. In this manner, materials can be placed on the apparatus. For example, the first and second arm may be positioned between materials placed thereon and the roof structure, while the load arms may also help to support the materials and/or help inhibit the materials from sliding off the first and second arms down the respective pitched surfaces.

Figure 1:
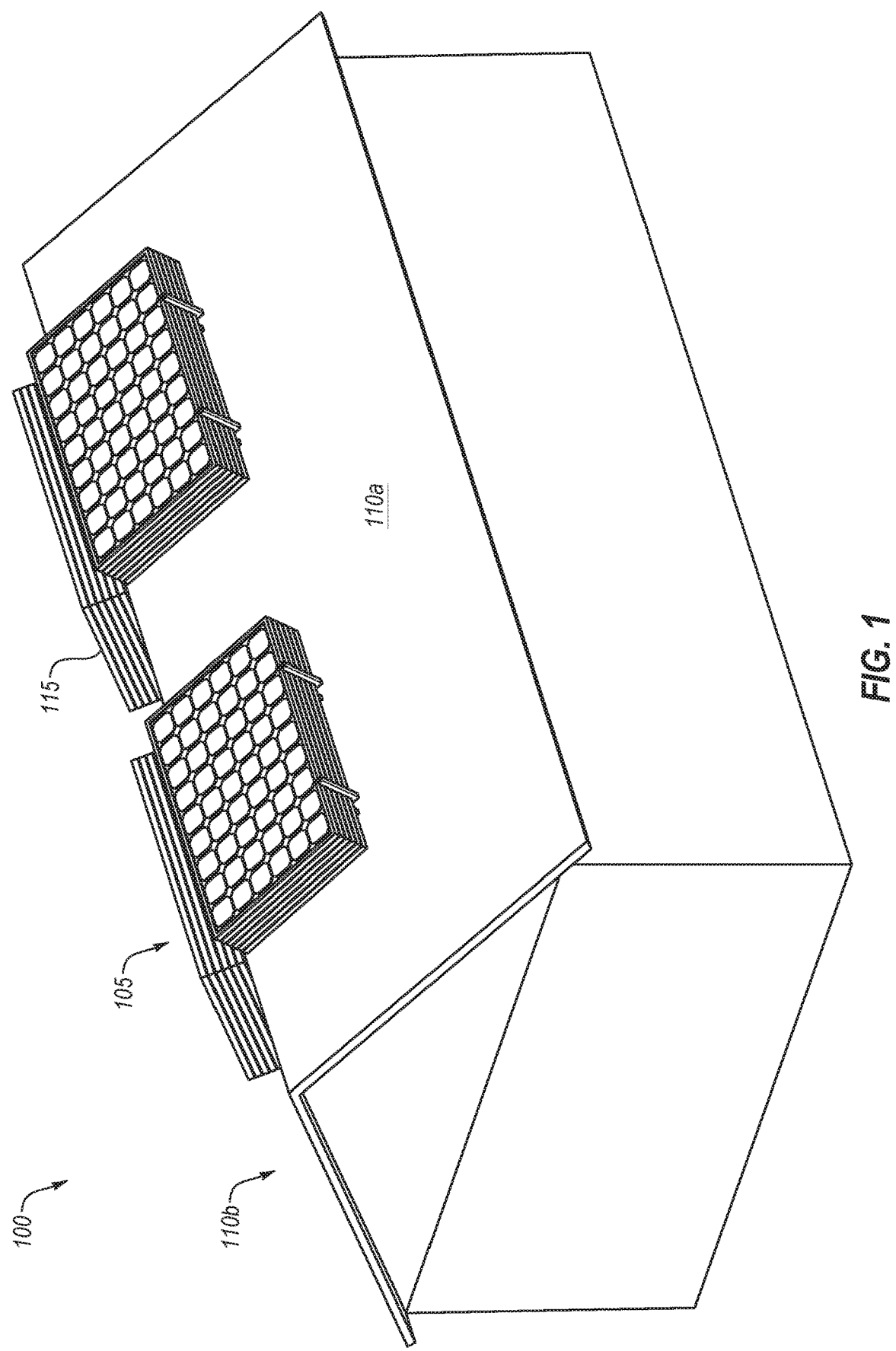
FIG. 1 illustrates an example environment of one embodiment of an example apparatus to stage example materials on a roof structure.

Turning to the figures, FIG. 1 illustrates an example environment 100 of one embodiment of an apparatus 105 (in this example case, multiple apparatuses 105) to stage example materials 115 on a roof structure, all arranged in accordance with at least one embodiment described in the present disclosure. As illustrated, the apparatus 105 may be configured to be positioned on a roof structure. For example, one side of the apparatus 105 may be positioned on a first pitched surface 110a, and the other side of the apparatus 105 may be positioned on a second pitched surface 110b such that a ridge of the roof structure may be positioned between each side of the apparatus 105. Further, the apparatus 105 may include arms which are adjustable according to the pitch, whether the pitch is the same or different for the respective pitched surfaces of the roof structure.

Additionally, FIG. 1 also illustrates the apparatus 105 with arms sized and shaped to receive solar panels as an example form of materials 115 configured to be placed thereon. For example, the apparatus 105 may be sized and shaped to receive solar panels of about 65 inches by about 39 inches, while in other embodiments for solar panels sized about 77 inches by about 39 inches, and in other embodiments for solar panels sized about 61 inches by about 41 inches. In other embodiments, custom sizing of solar panels may fit on the apparatus 105. Additionally or alternatively, the apparatus 105 may be sized and shaped to receive other solar materials such as racking, inverters, clamps, flashings, roof and rack attachments/fasteners, tools, and other installation equipment for installing the solar materials. These and other types of materials 115 may be bagged, wrapped, gathered, organized, or otherwise staged together or separately for positioning on the apparatus 105 as may be desirable for a given application or setting. Additionally or alternatively, the arms and/or other aspects of the apparatus 105 may be sized and shaped for staging materials 115 other than solar materials. For example, materials 115 that may be staged on the roof structure via the apparatus 105 may include shingles, tile, slate, sheathing, flashing, drip edge, soffit, fascia, felt paper, starter, nails, tools, and other suitable materials for roofing applications and construction/installation projects.

Modifications, additions, or omissions may be made to the embodiments of FIG. 1 without departing from the scope of the present disclosure. For example, in some embodiments, the apparatus 105 may include any number of other components that may not be explicitly illustrated or described. Additionally or alternatively, for example, the apparatus 105 may include different sizes and shapes of various components than may be explicitly illustrated or described.

Figure 2:
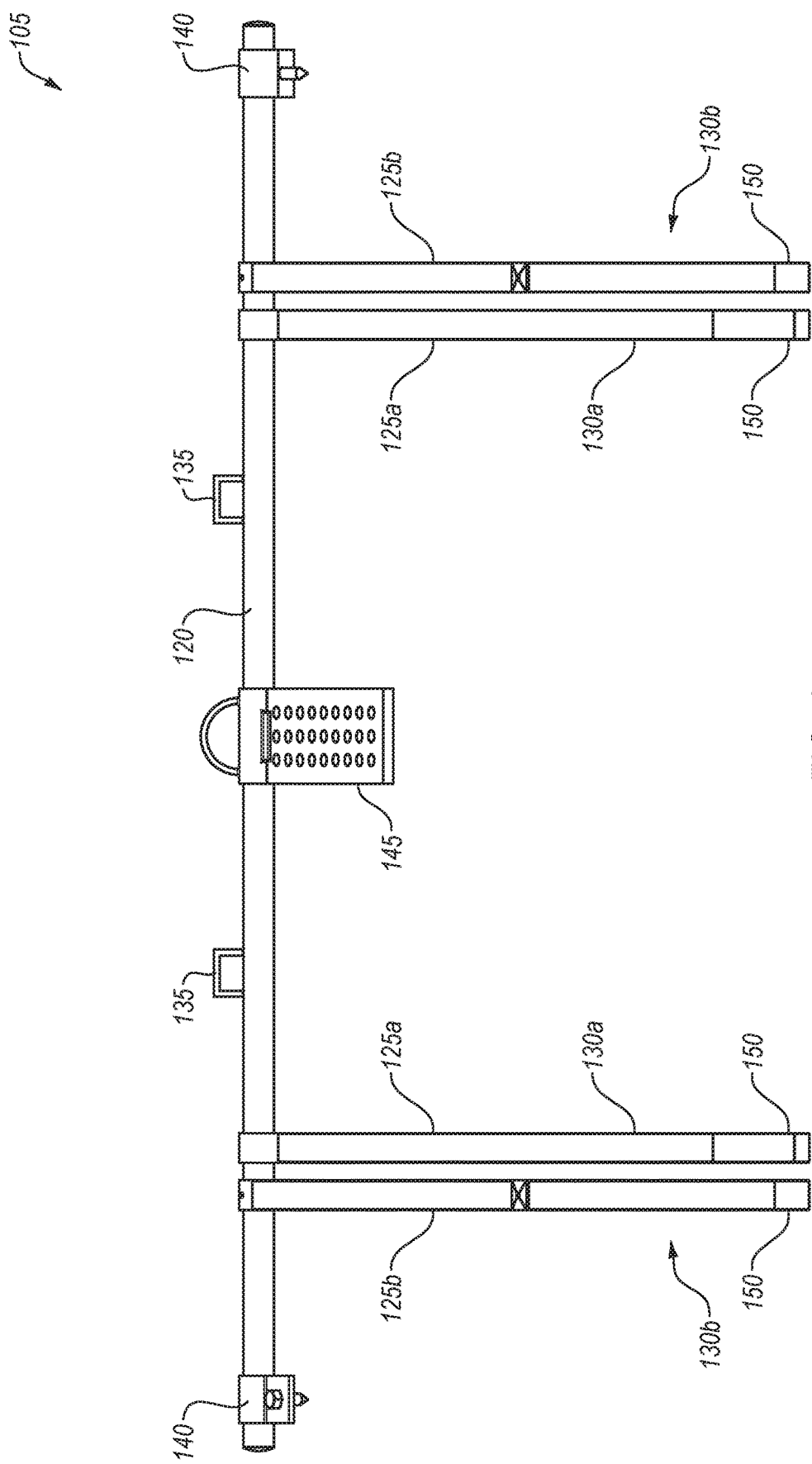
FIG. 2 illustrates a front view of the example apparatus of FIG. 1 to stage materials on a roof structure.
Figure 3:
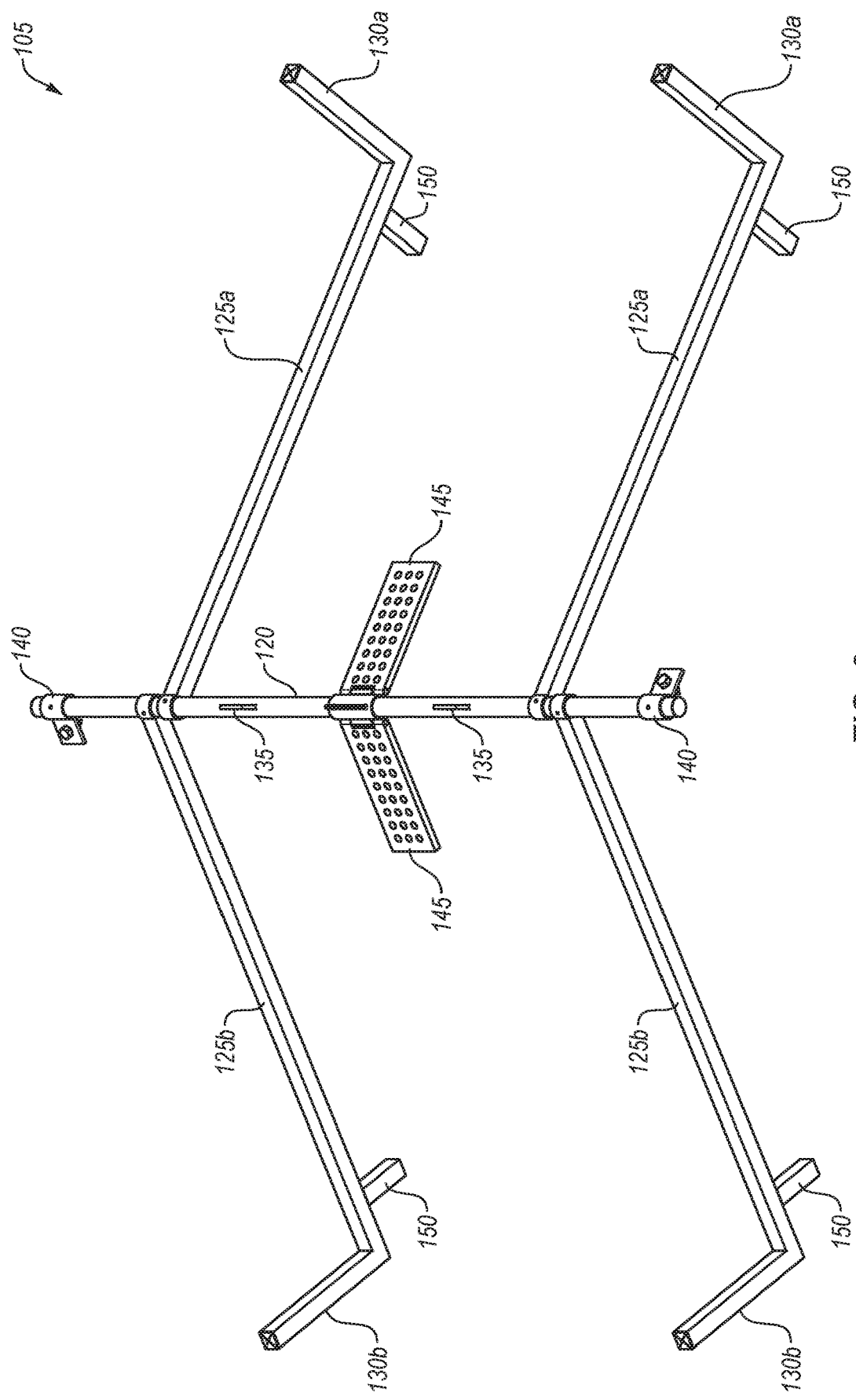
FIG. 3 illustrates a top-side perspective view of the example apparatus of FIG. 1 to stage materials on a roof structure.
Figure 4:
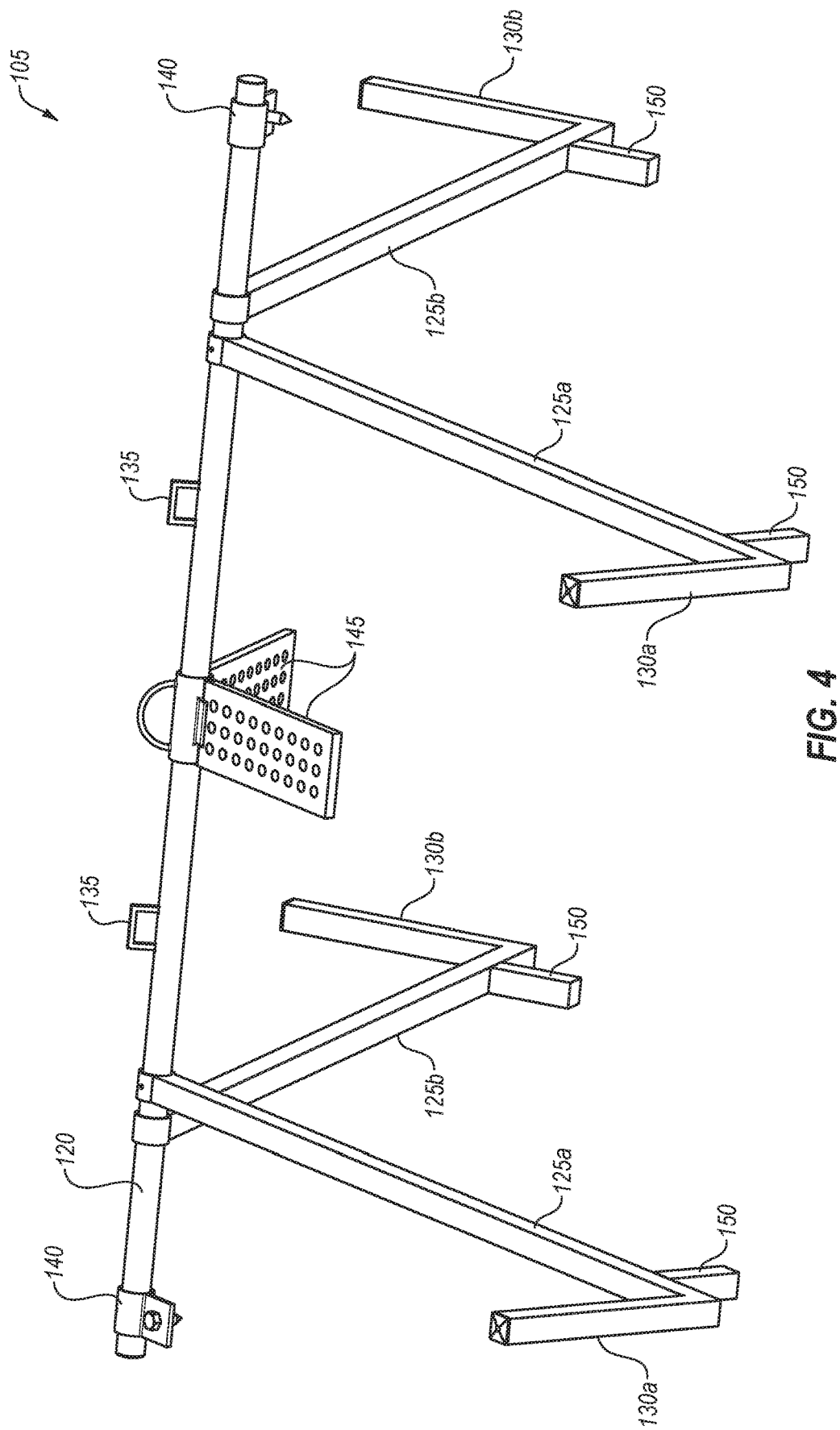
FIG. 4 illustrates a front perspective view of the example apparatus of FIG. 1 to stage materials on a roof structure.

FIGS. 2-4 illustrate various view of the example apparatus 105 to stage materials on a roof structure, all arranged in accordance with at least one embodiment described in the present disclosure. As illustrated the apparatus 105 may include a ridge member 120, a first arm 125a, a second arm 125b, and load arms 130a/b.

In some embodiments, the ridge member 120 may include a rod configured to be positioned along a ridge of a roof structure, for example, at an apex between two pitched surfaces. The ridge member 120 may be collapsible, semi-collapsible, or fully fixed in length. Additionally or alternatively, the ridge member 120 may include one or more receptacles or lock mechanisms for receiving detachable arms, such as the first arm 125a and the second arm 125b. In these or other embodiments, the first arm 125a and the second arm 125b may be configured to swivel, for example, from a stowed position to an operative position. The stowed position may be approximately parallel to the ridge member 120, while the operative position may be a non-parallel position (e.g., angled or approximately perpendicular to the ridge member 120). Additionally or alternatively, upon swiveling either or both of the first arm 125a and the second arm 125b from the stowed position to the operative position, the first arm 125a and/or the second arm 125b may lock into position. In these or other embodiments, a release mechanism on either or both of the ridge member 120 and the arms may release the first arm 125a and the second arm 125b in order to detach from any of the receptacles, lock mechanisms, or locked positions. In this manner, the first arm 125a and the second arm 125b may be completely detachable from the ridge member 120 in some embodiments, while in other embodiments, partially detachable (e.g., movable to/from the stowed position). Thus, in some embodiments, transportation of the apparatus 105 may also be simplified and/or made more convenient.

In some embodiments, the first arm 125a and the second arm 125b may be rotatably coupled to the ridge member 120. For example, the first arm 125a and the second arm 125b may be configured to rotate 360 degrees around the ridge member 120. In this manner, both the first arm 125a and the second arm 125b may be configured to adjust according to a first pitch and a second pitch, respectively. Thus, in some embodiments, the first arm 125a may extend outward, relative to the ridge member 120, in a first plane angled relative to the first pitch of the roof structure. For example, the first plane may be parallel or substantially parallel to the first pitch of the roof structure. Alternatively, in some embodiments, the first plane may be angled at about 10 degrees to about 15 degrees, about 15 degrees to about 20 degrees, about 20 degrees to about 30 degrees, about 30 degrees to about 40 degrees, all relative to the first pitch of the roof structure. Likewise, in some embodiments, the second arm 125b may extend outward, relative to the ridge member 120 in a second plane that may be angled relative to the second pitch of the roof structure. For example, the second plane may be parallel or substantially parallel to the second pitch of the roof structure. Alternatively, in some embodiments, the second plane may be angled at about 10 degrees to about 15 degrees, about 15 degrees to about 20 degrees, about 20 degrees to about 30 degrees, about 30 degrees to about 40 degrees, all relative to the second pitch of the roof structure. In these or other embodiments, the outward extension of the first arm 125a and the second arm 125b away from the ridge member 120 may be the operative position, e.g., the position for receiving materials thereon. In this manner, the first arm 125a and the second arm 125b may be configured to be positioned between the roof structure and the materials.

In some embodiments, additional arms (similar to or the same as the first/second arms 125a/b) may be provided to one or both sides of the apparatus 105 as needed (e.g., for additional payload capacity, increased structural rigidity, added stability of materials thereon, etc.). For example, a third arm may be rotatably coupled to the ridge member 120 and extend outward, relative to the ridge member 120, in the first plane angled relative to the first pitch of the roof structure, where the third arm and the first arm 125a may be configured as a tandem support section. Additionally or alternatively, a fourth arm may be rotatably coupled to the ridge member 120 and extend outward, relative to the ridge member 120, in the second plane angled relative to the second pitch of the roof structure, where the fourth arm and the second arm 125*b* may be configured as another tandem support section. In some embodiments, the third arm, the fourth arm, or any other additional arms attached to the ridge member 120 may be moved relative to the first arm 125*a* and the second arm 125*b* (e.g., slid towards or away from the first/second arm 125*a/b*) to match a given size and shape of the materials. Thus, in some embodiments, one or more of the pitches of the roof structure may include one arm, two arms, three arms, about five arms, about seven arms, or some other suitable number of arms that are attached to the ridge member 120.

In some embodiments, a load arm 130 may be coupled at each respective end portion of the first arm 125*a* and the second arm 125*b* (and any additional arms, such as the third arm 125*a* and the fourth arm 125*b*). For example, the load arm 130 may be angled relative to the first arm 125*a* and the second arm 125*b* such that the load arm 130 may be configured as a mechanical stop to inhibit pitch translation of the materials placed on at least one of the first arm 125*a* and the second arm 125*b*. For instance, at steeper pitches, the materials positioned on the first arm 125*a* and/or the second arm 125*b* may be more prone to sliding or rolling than may be the case at less steep pitches. Irrespective of pitch, the load arms 130*a/b* may function as a mechanical stop and provide increased safety, support and rigidity to the apparatus 105. For example, the load arms 130*a/b* may support a base portion of the materials (including in stacked configurations) when positioned on the first and/or second arms 125*a/b* as described in greater detail below in conjunction with the description of FIGS. 6-8.

In some embodiments, any of the ridge member 120, the first arm 125*a* and the second arm 125*b*, and the load arms 130*a/b* may also include additional elements removably/permanently attached or coupled thereto. For example, in some embodiments, one or more feet 150 may be coupled to each of the first arm 125*a* and the second arm 125*b*. The feet 150 may be configured to be positioned between the roof structure and each of the first arm 125*a* and the second arm 125*b*. In this manner, the feet 150 may help to provide one or more of support to the first arm 125*a* and the second arm 125*b*, friction between the roof structure and the first/second arms 125*a/b*, and additional working space. For example, the feet 150 may be interspaced to provide support at various portions along the first/second arms 125*a/b*. Additionally or alternatively, the feet 150 may be made of a material with sufficient surface roughness or gripping power configured to impart a friction force to help prevent sliding of the apparatus 105. In some embodiments, the feet 150 may also be configured to provide additional working space by elevating the first/second arms 125*a/b* above the roof structure.

For example, the first/second arms 125*a/b* may be elevated by the feet 150 sufficiently such that materials may be installed or maneuvered underneath outer portions of the first/second arms 125*a/b* positioned farthest away from the ridge of the roof structure. In these or other embodiments, the feet 150 may cause the first/second arms 125*a/b* to deviate angle-wise from the respective pitches of the roof structure. Thus, in some embodiments, either or both of the first/second arms 125*a/b* respectively positioned in the first plane and the second plane may be angled in a non-parallel manner relative to the respective pitches of the roof structure. In other embodiments, the feet 150 may not cause the first/second arms 125*a/b* to deviate angle-wise from the respective pitches of the roof structure. Thus, in some embodiments, either or both of the first/second arms 125*a/b* respectively positioned in the first plane and the second plane may be angled in a parallel or substantially parallel manner relative to the respective pitches of the roof structure.

In some embodiments, other additional elements may be removably/permanently attached or coupled to any of the ridge member 120, the first arm 125*a* and the second arm 125*b*, and the load arms 130*a/b*. For example, the ridge member 120 may include an attachment element 135 configured to receive one or more straps used for securing the materials to the apparatus 105. In some embodiments, the attachment element 135 may include a u-shaped bracket, eye bolt, or some other fastener for hooking into or otherwise connecting to securing straps.

Additionally or alternatively (e.g., to the attachment element 135), the apparatus 105 may include a safety mechanism 145 configured to receive one or more personnel-securing elements. The safety mechanism 145 may be securable to the roof structure. In these or other embodiments, the personnel-securing elements may include a rope, a carabiner, a harness, a tether, or other suitable safety gear configured to safely secure personnel via the safety mechanism 145 to one or both of the apparatus 105 and the roof structure, while on the roof structure.

Additionally or alternatively, in some embodiments, the ridge member 120 may include an anchor mechanism 140 configured to anchor the ridge member 120 to the ridge of the roof structure, for example, using an eyelet bracket and/or various fasteners for roof applications. For instance, in some embodiments, the anchor mechanism 140 may fix the apparatus 105 in position such that materials may be placed thereon. Further, with the anchor mechanism 140, the apparatus 105 may be loaded in a one-sided manner without the need to counterbalance by loading the other side of the apparatus 105. In other embodiments without the anchor mechanism 140, counterbalancing the apparatus 105 may be a loading/unloading consideration such that a payload of materials does not become too great on one side of the apparatus 105, thereby potentially risking pitch translation of the apparatus 105 (depending on degree of pitch, inclement weather, etc.). For example, without use of the anchor mechanism 140, the ridge member 120 nor any other element of the apparatus 105 may be fastened to the roof structure, and materials may be loaded/unloaded in an alternating side-to-side fashion to help provide a counterbalancing effect to the apparatus 105. In this example, impact to the integrity of the roofing structure (e.g., from drilling holes) is prevented or reduced.

Additionally or alternatively, in some embodiments, the anchor mechanism 140 may be positioned on at least one or both of the first and second arm 125*a/b* to thereby fix the apparatus 105 to the roof structure, for example, using an eyelet bracket and/or various fasteners for roof applications. In these or other embodiments, the anchor mechanism 140 may enable a bottom surface of the first/second arm 125*a/b* or a connecting element to be flush with the roof structure. In other embodiments, the anchor mechanism 140 may fix the first/second arm 125*a/b* to the roof structure while also creating a separation distance or offset.

Modifications, additions, or omissions may be made to the embodiments of FIGS. 2-4 without departing from the scope of the present disclosure. For example, in some embodiments, the first and second arm 125*a/b* may include any number of other components that may not be explicitly illustrated or described. Additionally or alternatively, for example, the first and second arm 125*a/b* may include different sizes and shapes for staging materials than may be explicitly illustrated or described.

Figure 5:
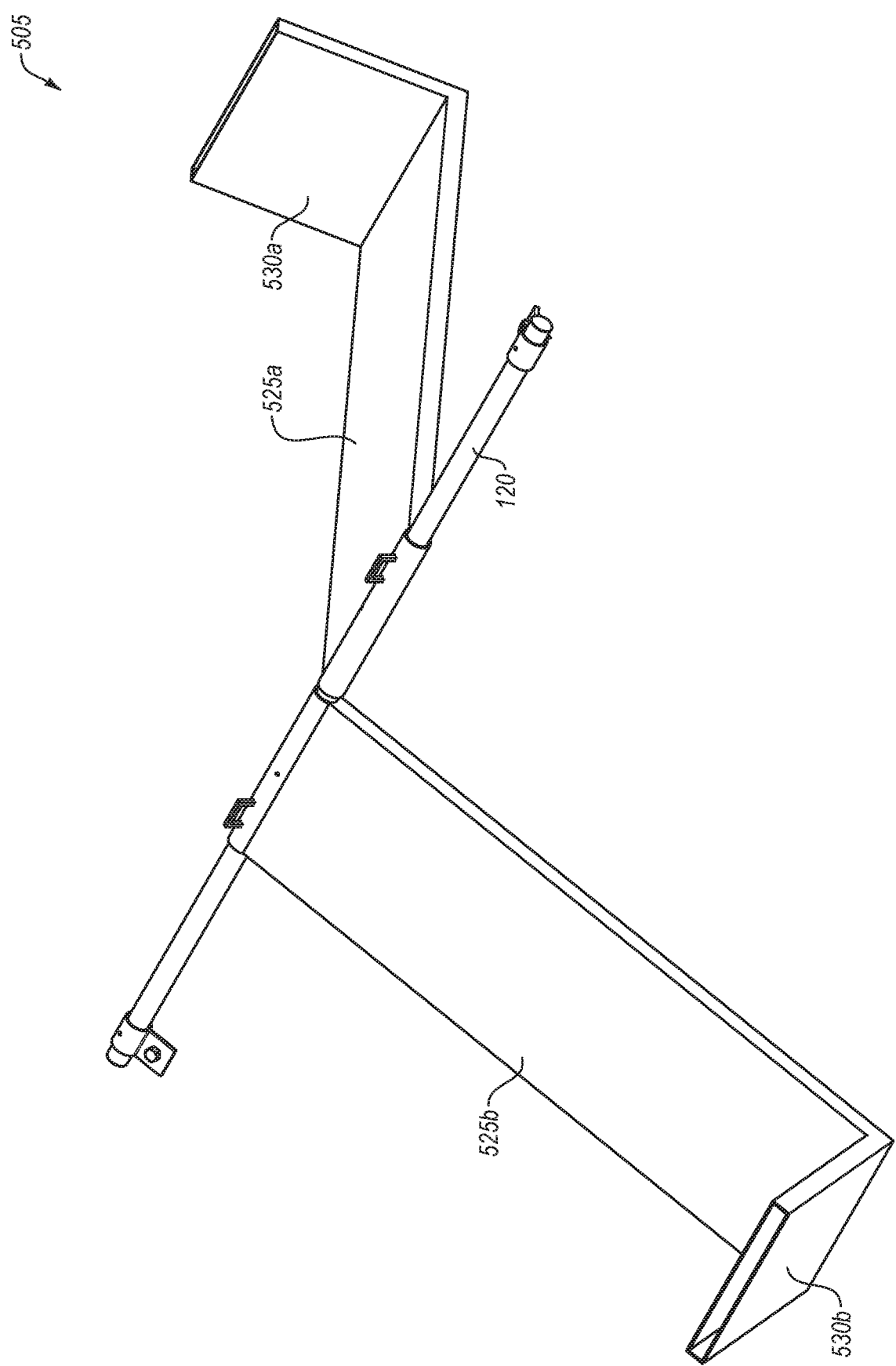
FIG. 5 illustrates a perspective view of another embodiment of the example apparatus of FIG. 1 to stage materials on a roof structure.

FIG. 5 illustrates a perspective view of another embodiment of an example apparatus 505 to stage materials on a roof structure, all arranged in accordance with at least one embodiment described in the present disclosure. As illustrated the apparatus 505 may include the ridge member 120, a first arm 525a, a second arm 525b, and load arms 530a/b. The ridge member 120 may be the same as or substantially similar to the ridge member 120 in FIGS. 2-4. Additionally or alternatively, the first arm 525a, the second arm 525b, and the load arms 530a/b may be widened, e.g., relative to the first arm 125a, the second arm 125b, and the load arms 130a/b, respectively, of FIGS. 2-4. In these or other embodiments, a widened configuration of the first arm 525a, the second arm 525b, and the load arms 530a/b may reduce a number of additional arms attached to the ridge member 120 used to stage materials on a roof structure. For example, the first arm 525a, the second arm 525b, and the load arms 530a/b may be sized and shaped to support the materials without any additional arms attached to the ridge member 120. Additionally or alternatively, the widened configuration of the first arm 525a, the second arm 525b, and the load arms 530a/b may increase a payload capacity of the apparatus 505, increase a level of stability of the apparatus 505 or materials placed thereon, etc. In these or other embodiments, the first/second arms 525a/b may be aligned relative to each other, while in other embodiments, the first/second arms 525a/b may be offset (as illustrated in FIG. 5) relative to each other in a direction parallel to the ridge member 120.

Modifications, additions, or omissions may be made to the embodiments of FIG. 5 without departing from the scope of the present disclosure. For example, in some embodiments, the apparatus 505 may include any number of other components that may not be explicitly illustrated or described. Additionally or alternatively, for example, the apparatus 505 may include different sizes and shapes of various components than may be explicitly illustrated or described.

Figure 6:
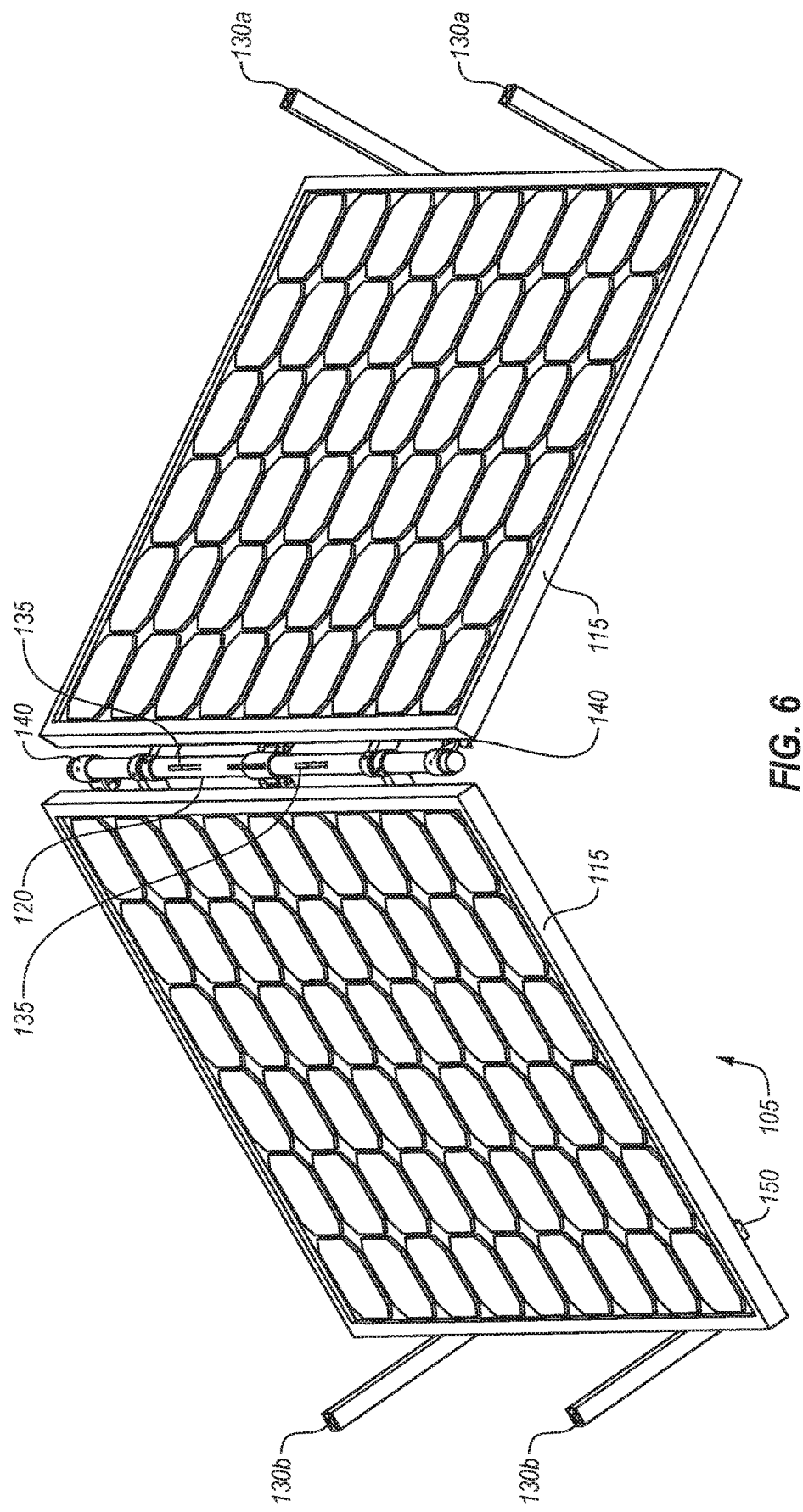
FIG. 6 illustrates a top-side perspective view of the example apparatus of FIG. 1 with example materials staged thereon.
Figure 7:
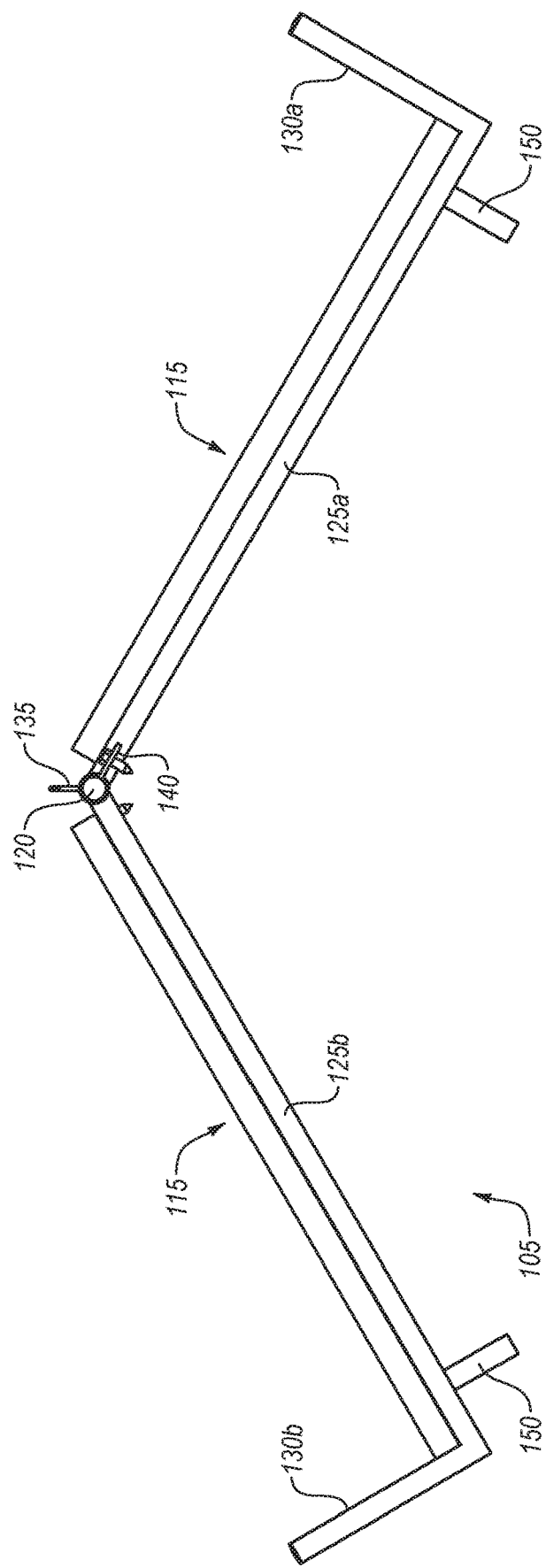
FIG. 7 illustrates a side view of the example apparatus of FIG. 1 with example materials staged thereon.
Figure 8:
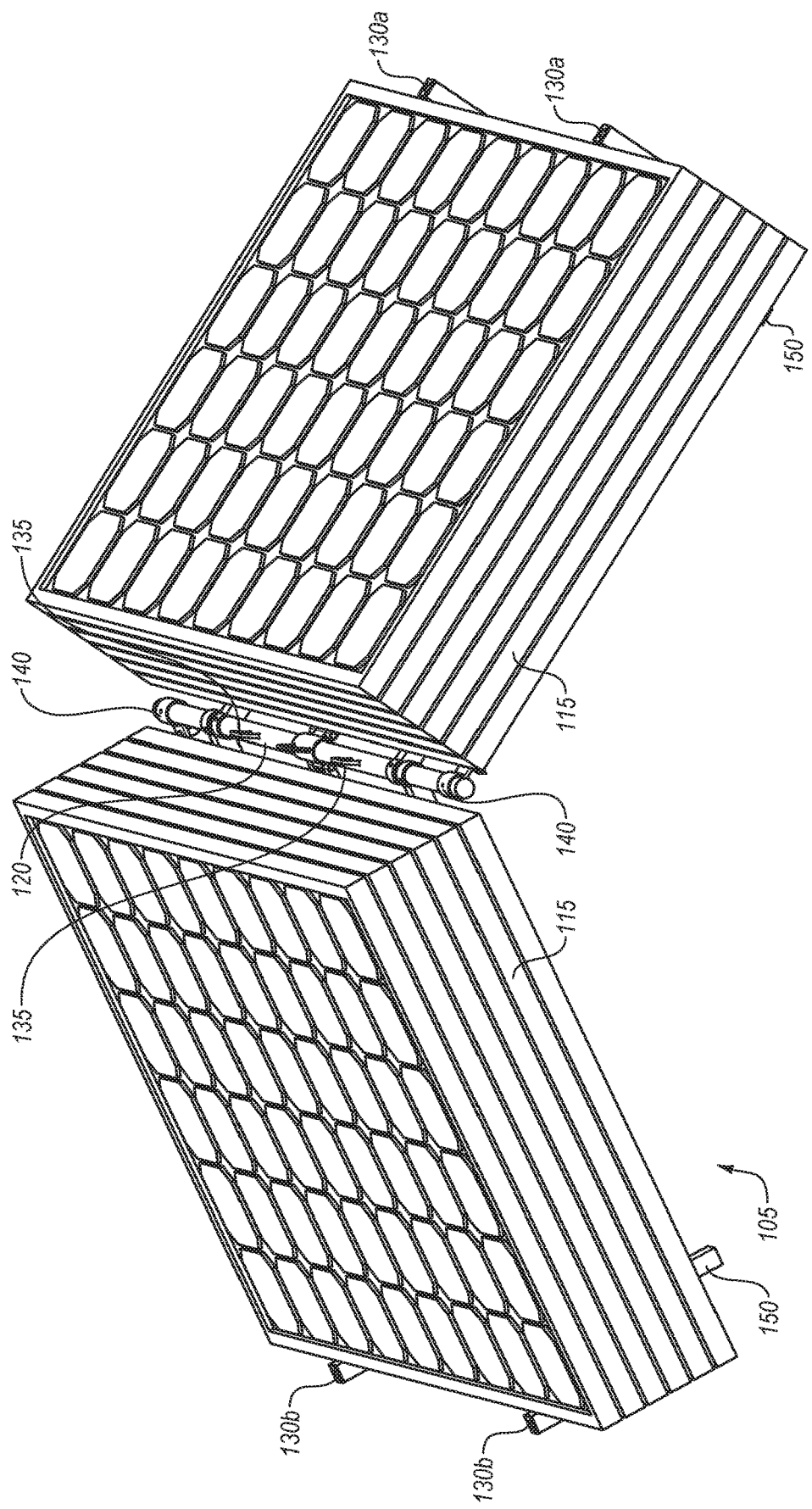
FIG. 8 illustrates a top-side perspective view of the example apparatus of FIG. 1 with example materials staged thereon in a stacked configuration.

FIGS. 6-8 illustrate various views of the example apparatus 105 with example materials 115 placed thereon, all arranged in accordance with at least one embodiment described in the present disclosure. As illustrated the apparatus 105 may include the ridge member 120, the first arm 125a, the second arm 125b, the load arms 130a/b, the attachment element 135, the anchor mechanism 140, and the feet 150, each of which may be the same as or similar to those illustrated in any of FIGS. 1-5.

The materials 115 may be positioned on the apparatus 105, for example, on the first and second arm 125a/b and corresponding load arms 130a/b. In these or other embodiments, the first arm 125a, the second arm 125b, and each load arm 130 as a combined unit may be configured to have a payload capacity in excess of a weight of the materials 115. In some embodiments, the apparatus 105 may be made of a lightweight, durable material such as aluminum. However, other embodiments may include different material for different payload capacities and/or various material properties. Additionally or alternatively, any of the first and second arm 125a/b and corresponding load arms 130a/b may include a traction element on surfaces configured to interface with the materials 115. For example, the traction element may help to inhibit movement of the materials 115 on the apparatus 105 once positioned thereon. For instance, a "grip strip" lining, coating, or add-on adhesive may be placed on various portions configured to contact the materials 115. Additionally or alternatively, the grip strip may be a soft, protective element against abrasion forces between the materials 115 and any of the first and second arm 125a/b and corresponding load arms 130a/b.

In some embodiments, the apparatus 105 may be configured for a stacked configuration of materials 115. For example, the load arms 130a/b may include a length configured to mechanically stop multiple stacked materials 115. For instance, in some embodiments, the materials 115 may be stacked in several unit layers, e.g., about two to five unit layers, about four to seven unit layers, or up to about ten unit layers.

In some embodiments, the apparatus 105 may also include a plurality of spacer elements (not shown) that are removably attached to any of the ridge member 120, the first/second arms 125a/b, and the load arms 130a/b. The spacer elements may be configured to be positioned between stacked materials 115, thereby helping to protect the materials 115 from abrasions, inclement weather, and similar preventable damage. For example, the spacer elements may be positioned along various outer portions of the materials 115 and/or at corner(s) of the materials 115. Additionally or alternatively, the spacer elements may function as a slip cover or blanket configured to protectively cover a substantial or entire portion of a surface area of the materials 115. In these or other embodiments, the spacer elements may be foldable, packable, easily transportable, and/or detachable from the apparatus 105.

Modifications, additions, or omissions may be made to the embodiments of FIGS. 6-8 without departing from the scope of the present disclosure. For example, in some embodiments, different materials 115 may be staged on the roof structure that may be explicitly illustrated or described.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner. Additionally, the terms "about" or "approximately" should be interpreted to mean 10% of actual value.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. An apparatus for staging materials on a roof structure, the apparatus comprising:
   a ridge member;
   a first arm rotatably coupled to the ridge member and extending outward, relative to the ridge member, in a first plane angled relative to a first pitch of the roof structure;
   a second arm rotatably coupled to the ridge member and extending outward, relative to the ridge member, in a second plane angled relative to a second pitch of the roof structure,
   wherein the ridge member is configured to be positioned at an apex between the first pitch and the second pitch along a ridge of the roof structure, and
   wherein the materials for installation are configured to be placed on at least one of the first arm and the second arm such that one or both of the first arm and the second arm, respectively, are positioned between the roof structure and the materials; and
   a load arm coupled at each respective end portion of the first arm and the second arm, the load arm angled relative to the first arm and the second arm, and the load arm configured as a mechanical stop to inhibit pitch translation of the materials placed on at least one of the first arm and the second arm,
   wherein both of the first arm and the second arm are configured to rotate 360 degrees around the ridge member.

2. The apparatus of claim 1, wherein the first arm, the second arm, and each said load arm as a combined unit have a payload capacity which is greater than a material weight of the combined unit.

3. The apparatus of claim 2, wherein each said load arm includes a length configured to stop the materials in a stacked configuration.

4. The apparatus of claim 1, wherein one or more of the first arm, the second arm, and the load arms are detachable from the ridge member.

5. The apparatus of claim 1, wherein the ridge member includes an attachment element configured to receive one or more securing straps.

6. An apparatus for staging materials on a roof structure, the apparatus comprising:
   a ridge member;
   a first arm rotatably coupled to the ridge member and extending outward, relative to the ridge member, in a first plane angled relative to a first pitch of the roof structure;
   a second arm rotatably coupled to the ridge member and extending outward, relative to the ridge member, in a second plane angled relative to a second pitch of the roof structure,
   wherein the ridge member is configured to be positioned at an apex between the first pitch and the second pitch along a ridge of the roof structure, and
   wherein the materials for installation are configured to be placed on at least one of the first arm and the second arm such that one or both of the first arm and the second arm, respectively, are positioned between the roof structure and the materials; and
   a load arm coupled at each respective end portion of the first arm and the second arm, the load arm angled relative to the first arm and the second arm, and the load arm configured as a mechanical stop to inhibit pitch translation of the materials placed on at least one of the first arm and the second arm, wherein the ridge member includes an attachment element configured to receive one or more securing straps, wherein the attachment element includes a u-shaped bracket.

7. The apparatus of claim 1, wherein one or both of the ridge member and the first and/or second arm include an anchor mechanism configured to anchor the ridge member to the roof structure.

8. An apparatus for staging materials on a roof structure, the apparatus comprising:
 a ridge member;
 a first arm rotatably coupled to the ridge member and extending outward, relative to the ridge member, in a first plane angled relative to a first pitch of the roof structure;
 a second arm rotatably coupled to the ridge member and extending outward, relative to the ridge member, in a second plane angled relative to a second pitch of the roof structure,
 wherein the ridge member is configured to be positioned at an apex between the first pitch and the second pitch along a ridge of the roof structure, and
 wherein the materials for installation are configured to be placed on at least one of the first arm and the second arm such that one or both of the first arm and the second arm, respectively, are positioned between the roof structure and the materials; and
a load arm coupled at each respective end portion of the first arm and the second arm, the load arm angled relative to the first arm and the second arm, and the load arm configured as a mechanical stop to inhibit pitch translation of the materials placed on at least one of the first arm and the second arm, wherein one or both of the ridge member and the first and/or second arm include an anchor mechanism configured to anchor the ridge member to the roof structure, wherein the anchor mechanism includes an eyelet bracket.

9. The apparatus of claim 1, further comprising a foot coupled to each of the first arm and the second arm, the foot configured to be positioned between the roof structure and each of the first arm and the second arm.

10. The apparatus of claim 9, wherein the foot is configured to provide one or more of: (i) support to the first arm and the second arm, (ii) friction between the roof structure and the first arm and the second arm, and (iii) additional working space.

11. The apparatus of claim 1, wherein one or more of the first arm, the second arm, and each said load arm include a traction element on surfaces configured to interface with the materials.

12. The apparatus of claim 1, further comprising a safety mechanism configured to receive one or more personnel-securing elements for securing a person to the roof structure.

13. The apparatus of claim 12, wherein the safety mechanism is securable to the roof structure.

14. The apparatus of claim 1, wherein the first arm and the second arm are adjustable according to the first pitch and the second pitch, respectively.

15. The apparatus of claim 1, wherein the first arm, the second arm, and the load arms are sized and shaped to receive solar panels as the materials.

16. The apparatus of claim 1, further comprising:
 a third arm rotatably coupled to the ridge member and extending outward, relative to the ridge member, in the first plane angled relative to the first pitch of the roof structure, the third arm and the first arm configured as a tandem support section; and
 a fourth arm rotatably coupled to the ridge member and extending outward, relative to the ridge member, in the second plane angled relative to the second pitch of the roof structure, the fourth arm and the second arm configured as another tandem support section.

17. The apparatus of claim 16, further comprising a load arm coupled at each respective end portion of the third arm and the fourth arm, the load arm angled relative to the third arm and the fourth arm, and the load arm configured as a mechanical stop to inhibit pitch translation of the materials placed on at least one of the third arm and the fourth arm.

18. The apparatus of claim 1, wherein the first arm, the second arm, and each said load arm are sized and shaped to support the materials without any additional arms attached to the ridge member.

19. The apparatus of claim 1, wherein the first arm and the second arm are offset relative to each other in a direction parallel to the ridge member.

* * * * *